United States Patent [19]
Walker

[11] 3,927,954
[45] Dec. 23, 1975

[54] POWER TAKE-OFF FOR POWER STEERING PUMP

[76] Inventor: Fred W. Walker, 262 W. Chaparral St., Rialto, Calif. 92370

[22] Filed: Sept. 20, 1974

[21] Appl. No.: 507,940

Related U.S. Application Data

[63] Continuation-in-part of Ser. No. 377,715, Sept. 7, 1973, abandoned.

[52] U.S. Cl. ............... 417/360; 417/362; 417/364; 74/230.01; 123/41.47; 123/195 A
[51] Int. Cl.² ............... F04B 17/00; F01P 5/10;
[58] Field of Search ............... 417/364, 362, 417/355, 231, 360; 123/41.47, 195 A; 418/175, 177; 74/230.01

[56] References Cited
UNITED STATES PATENTS

| | | | |
|---|---|---|---|
| 1,376,903 | 5/1921 | Strickland | 417/364 UX |
| 1,416,063 | 5/1922 | Redding | 74/230.01 |
| 2,666,395 | 1/1954 | Hartwell | 417/360 |
| 3,251,308 | 5/1966 | Dugan | 418/175 X |

Primary Examiner—C. J. Husar
Assistant Examiner—Richard E. Gluck
Attorney, Agent, or Firm—John H. Crowe; Jess M. Roberts

[57] ABSTRACT

To save space, promote safety, reduce the load on the engine, and lower cost, the power steering pump of an automotive vehicle is close coupled to the end of the engine crankshaft in axial alignment therewith, and a substantial portion of the pump is enclosed by a cylindrical shell that is directly coupled to the crankshaft for rotation therewith. The cylindrical shell is formed with a plurality of circumferential pulley grooves to receive corresponding belts to drive a plurality of components such as the usual cooling fan, the usual generator, and an air conditioning compressor.

9 Claims, 5 Drawing Figures

U.S. Patent Dec. 23, 1975 3,927,954
FIG. 1.
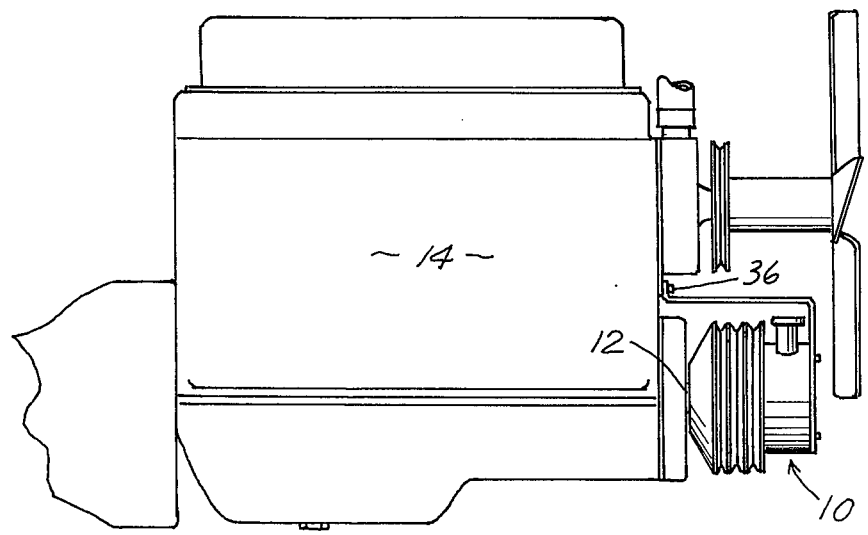
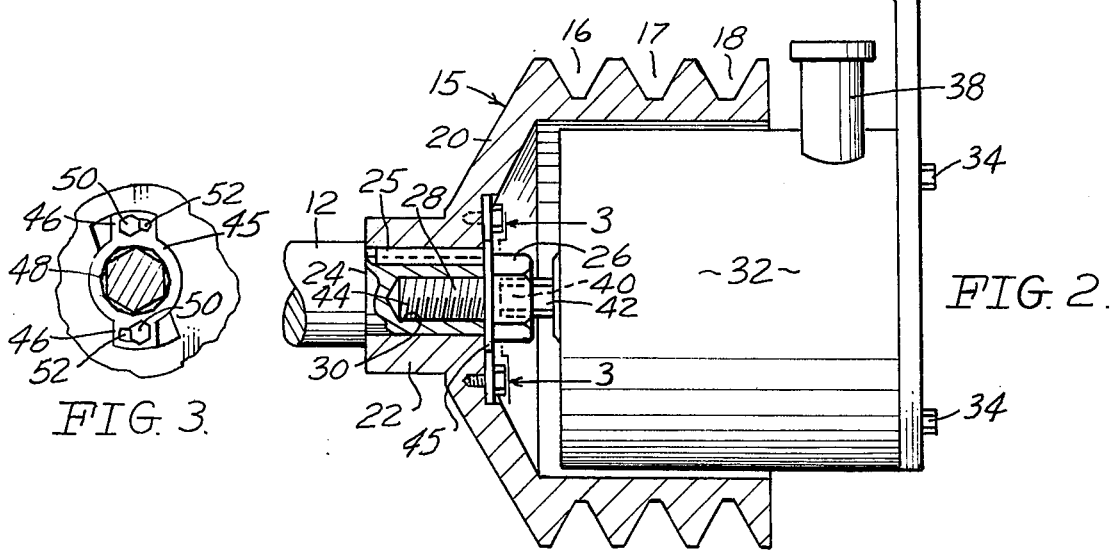
FIG. 2.
FIG. 3.
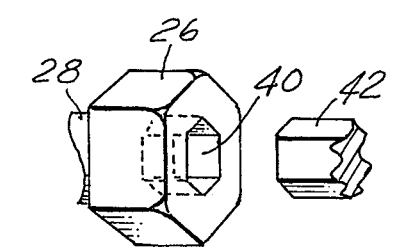
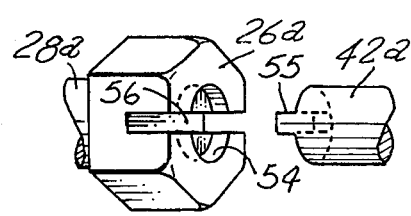
FIG. 4. FIG. 5.

3,927,954

POWER TAKE-OFF FOR POWER STEERING PUMP

CROSS-REFERENCE TO RELATED APPLICATIONS:

This application is a continuation-in-part of my copending application, Ser. No. 377,715 filed Sep. 7, 1973, now abandoned.

BACKGROUND OF THE INVENTION

Although power steering for automotive vehicles was introduced many years ago, the power take-off for actuating a plurality of components, including the power steering pump, the fan, the generator, etc., had invariably comprised a plurality of coaxial pulleys mounted on the end of the crankshaft of the engine to actuate belts to drive the various components. The array of belts together with the required supporting brackets and any belt tensioning device employed all take up substantial space under the hood of the vehicle. Since each belt is vulnerable to breakage and slippage, the greater the number of belts the greater the possibility of failure of a part of the power take-off. Failure of the belt that drives the power steering pump is a particular hazard because manual steering requires great effort in the absence of power assist, and in the case of a large automobile the required effort may be beyond the strength of a slight woman driver. It is also apparent that the greater the number of belts and pulleys employed in a power take-off assembly, the greater the load on the engine and also the greater the cost of the assembly.

SUMMARY OF THE INVENTION

Important objects of the invention include: saving space; promoting safety; reducing the load on the engine; and lowering the cost of the power take-off assembly.

Briefly described, these objects are attained by close coupling the power steering pump to the end of the engine crankshaft in axial alignment therewith, and by providing a plurality of drive pulley elements for the rest of the components in the form of a plurality of outer circumferential grooves in a cylindrical shell that encloses a substantial portion of the power steering pump. One end of the cylindrical shell is united with the end of the engine crankshaft for rotation thereby, and the other end of the shell is open. A suitable bracket supports the power steering pump at its new location.

This new arrangement results in saving space in a number of ways. In the first place, the power steering pump at its new location extends largely into the open end of the cylindrical shell so that, in effect, a substantial portion of the pump occupies the same space as the plurality of drive pulley elements. In addition, the space that is usually occupied by the power steering pump is made available for other purposes. In the second place, connecting the pump directly to the end of the crankshaft reduces the number of required pulleys and brackets. In the third place, the elimination of the usual belt to drive the power steering pump makes available the space that is usually occupied by such a belt.

With reference to the promotion of safety, the new concept completely eliminates the usual hazard of failure of the power steering pump belt, as well as the hazard of failure of either of the usual two pulleys that transmit power to the power steering pump.

Further, it may be readily understood that eliminating the pump belt and at least one pulley reduces the load on the engine by reducing the number of moving parts with corresponding reduction in inertia that must be overcome by the engine.

As for reduction of cost, the omitted belt, pulleys, and brackets are significant cost items, and in addition the elimination of the driven pulley on the pump shaft reduces the machining that is required on the pump shaft.

The various features and advantages of the invention may be understood from the following detailed description and the accompanying drawing.

BRIEF DESCRIPTION OF THE DRAWING

FIG. 1 is a fragmentary side elevation with parts omitted, showing the presently preferred embodiment of the power take-off mounted on the end of the engine crankshaft;

FIG. 2 is an enlarged sectional view showing the cylindrical pulley shell and the power steering pump partially enclosed thereby;

FIG. 3 is a sectional view on a reduced scale taken along line 3—3 in FIG. 2, showing the configuration of a locking device to prevent loosening of the screw on the end of the engine crankshaft;

FIG. 4 is a fragmentary perspective view on an enlarged scale, showing how the head of the screw on the end of the crankshaft is formed with a hexagonal recess to receive the hexagonal end of the power steering pump shaft; and FIG. 5 is a similar view showing how the head of the screw on the end of the crankshaft may be formed with a diametrical slot to receive a diametrical tongue formed on the end of the shaft of the power steering pump.

DESCRIPTION OF THE PREFERRED EMBODIMENT

In FIG. 1, the presently preferred embodiment of the power take-off, generally designated by reference numeral 10, is mounted on the protruding end of the crankshaft 12 of the vehicle engine 14. A pulley assembly in the form of a cylindrical shell 15 is formed with three outer circumferential pulley grooves 16, 17 and 18. The outer end of the cylindrical shell is open, but the inner end is closed by a conical wall 20 formed with a hub 22 that embraces the end of the crankshaft 12. The hub 22 backs against a radial shoulder 24 of the crankshaft and is interlocked with the crankshaft by a key 25. The hub is retained on the crankshaft by the hexagonal head 26 of a screw 28 that threads into an axial bore 30 in the end of the crankshaft.

The pump 32 of the power steering system of the vehicle is suitably mounted in axial alignment with the crankshaft 12 with the major portion of the pump enclosed by the shell 15. The outer end of the power steering pump 32 is secured by screws 34 to an angular bracket 35 that is mounted on the engine of the vehicle. In the construction shown, the angular bracket 35 overhangs the power steering pump and is connected by suitable screws 36 to the engine 14. The pump 32 has inlet and outlet ports, one of which is indicated at 38, the two ports being connected by tubing (not shown) to a power cylinder (not shown) in the usual manner.

The power steering pump 32 may be operatively connected to the cranksahft 12 by any suitable type of coupling. In this instance, the head 26 of the screw 28 is formed with a hexagonal socket 40, and a hexagonal end 42 of the pump shaft fits into the socket. It is assumed that the crankshaft 12 rotates clockwise as viewed from the front end of the crankshaft, the conventional direction of crankshaft direction, and therefore the screw 28 is formed with a left-hand thread 44 so that the screw will tend to tighten in reaction to the load imposed on the crankshaft by the power steering pump.

It is sometimes desirable to provide further means for positive prevention of loosening of the screw 28. For example, the screw 28 may be mechanically interlocked with the shell 15 by means of a retainer in the form of a locking plate 45, which is shown in FIGS. 2 and 3. The locking plate 45 is formed with two opposite tongues 46 and has a central opening 48 of the configuration of a 12-sided polygon which is dimensioned to embrace the hexagonal head 26 of the screw 28 in engagement with the six corners of the hexagonal head. The locking plate is anchored to the shell 15 by pair of cap screws 50, which extend through corresponding arcuate slots 52 in the two tongues 46 respectively.

The aforesaid locking plate is actually, in a sense, an alternative to the left-hand-thread screw arrangement described above for insuring against loosening of the screw 28, or its equivalent, in its socket. Thus, the locking plate can be employed with either a left- or right-hand-threaded screw, since it will prevent loosening of the screw in either direction, but there is no particular need for use of the plate with a left-handthreaded screw where the crankshaft turns in the conventional direction, although it is illustrated with such a screw in the drawing for purposes of a complete disclosure.

By way of example, FIG. 5 shows a different provision for close coupling the crankshaft 12 and the pump shaft 42. In this alternative construction, the hexagonal head 26a of the screw 28a is formed with a shallow bore 54 to receive the round end 42a of the pump shaft, and the end of the pump shaft is formed with a diametrical tongue 55 that fits into a corresponding diametrical slot 56 in the hexagonal head.

The pulley grooves 16-18 may be employed in various ways in various models of automobiles to actuate fans, alternators, air conditioning compressors, etc.

From the foregoing description, it is readily apparent how the improved power take-off achieves the stated objectives of saving space, promoting safety, reducing the engine load and cutting costs.

My description in specific detail of the presently preferred embodiment of the invention will suggest various changes, substitutions, and other departures from this embodiment within the spirit and scope of the following claims.

What I claim is:

1. In an automotive vehicle wherein a power shaft extending from the prime mover of the vehicle actuates a power steering pump together with a plurality of other components, the improvement for saving space, promoting safety, reducing the load on the prive mover, and reducing cost, comprising:
   said power steering pump extending axially from the end of the power shaft and being close coupled therewith for actuation thereby;
   means mounted on the vehicle in supporting engagement with the pump; and
   an assembly of pulley elements for driving said plurality of components by means of belts;
   said pulley elements being united with each other and being united with said power shaft axially thereof for actuation thereby;
   said pulley elements being hollow and enclosing at least a substantial part of said pump.

2. An improvement as set forth in claim 1 in which said assembly is in the form of a cylindrical shell connected at it inner end to the power shaft and open at its outer end;
   and in which said pulley elements are outer circumferential grooves in the shell.

3. In an automotive vehicle, the combination of:
   a prime mover for the vehicle;
   a power shaft extending from the prime mover;
   a plurality of drive pulley elements to actuate by means of belts various auxiliary components such as a fan, an alternator, and an air conditioning compressor;
   said plurality of pulley elements being outer circumferential grooves in a shell of generally cylindrical configuration;
   one end of the shell being united with the power shaft for rotation thereby and extending from the end of the shaft concentrically thereof;
   the other end of the shell being open;
   a power steering pump having a shaft on one end thereof;
   a substantial portion of the pump extending into the open end of the shell with the shaft of the pump directly connected to the power shaft for actuation thereby; and
   means mounted on the vehicle in supporting engagement with the power steering pump.

4. A combination as set forth in claim 3 in which the end of one of the two shafts is provided with a socket of non-circular cross sectional configuration and the end of the other of the two shafts of similar non-circular cross section and fits into the socket to form a coupling between the two shafts.

5. A combination as set forth in claim 4, in which said socket is in the form of a diametrical slot in the end of said one shaft and the end of the other shaft is formed with a tongue fitting into said slot.

6. A combination as set forth in claim 4, in which said socket is of polygonal configuration and the end of said other of the two shafts is of corresponding polygonal configuration.

7. A combination as set forth in claim 4 in which the end of said one of the two shafts is formed with a threaded axial bore, in which a screw with a head is threaded into said bore, and in which said socket is formed in the head of the screw.

8. A combination as set forth in claim 7 which includes means in engagement with both said shell and the head of the screw to prevent loosening of the screw.

9. A combination in accordance with claim 7 in which said one of the two shafts is said power shaft and the threaded axial bore has threads spiralling in a direction to insure tightening of said screw in said bore when the power shaft is turning in its normal direction of rotation.

* * * * *

UNITED STATES PATENT OFFICE
CERTIFICATE OF CORRECTION

Patent No. 3,927,954    Dated December 23, 1975

Inventor(s) Fred W. Walker

It is certified that error appears in the above-identified patent and that said Letters Patent are hereby corrected as shown below:

On the cover sheet item 76, "92370" should read -- 92376 --.

Column 3, line 62, "prive" should read -- prime --.

Column 4, line 41, after "shafts" insert -- is --.

Signed and Sealed this twenty-seventh Day of April 1976

[SEAL]

Attest:

RUTH C. MASON
Attesting Officer

C. MARSHALL DANN
Commissioner of Patents and Trademarks